United States Patent
Nakamura

(10) Patent No.: US 8,960,035 B2
(45) Date of Patent: Feb. 24, 2015

(54) RACK SHAFT SUPPORTING DEVICE AND STEERING SYSTEM INCLUDING THE SAME

(71) Applicant: JTEKT Corporation, Osaka-shi, Osaka (JP)

(72) Inventor: Kensaku Nakamura, Kashiba (JP)

(73) Assignee: JTEKT Corporation, Osaka (JP)

( * ) Notice: Subject to any disclaimer, the term of this patent is extended or adjusted under 35 U.S.C. 154(b) by 0 days.

(21) Appl. No.: 13/940,590

(22) Filed: Jul. 12, 2013

(65) Prior Publication Data

US 2014/0020493 A1 Jan. 23, 2014

(30) Foreign Application Priority Data

Jul. 20, 2012 (JP) .................. 2012-161722

(51) Int. Cl.
*F16H 35/00* (2006.01)
*F16H 1/04* (2006.01)
*F16H 57/021* (2012.01)
*F16H 19/04* (2006.01)
*F16H 55/28* (2006.01)
*B62D 3/12* (2006.01)

(52) U.S. Cl.
CPC .............. *F16H 57/021* (2013.01); *F16H 19/04* (2013.01); *F16H 55/283* (2013.01); *B62D 3/123* (2013.01)
USPC ........................................ 74/388 PS; 74/422

(58) Field of Classification Search
CPC ................................ B62D 3/123; F16H 55/283
USPC .............................. 74/388 PS, 422, 567, 570.2
See application file for complete search history.

(56) References Cited

U.S. PATENT DOCUMENTS

| | | | |
|---|---|---|---|
| 6,408,708 B1 * | 6/2002 | Sahr | 74/422 |
| 7,930,951 B2 * | 4/2011 | Eickholt | 74/388 PS |
| 8,256,315 B2 * | 9/2012 | Song | 74/422 |
| 2003/0074996 A1 * | 4/2003 | Camp | 74/422 |
| 2007/0209463 A1 * | 9/2007 | Song et al. | 74/388 PS |
| 2010/0024583 A1 | 2/2010 | Kawakubo et al. | |

FOREIGN PATENT DOCUMENTS

JP     A-2010-36610     2/2010

* cited by examiner

*Primary Examiner* — Justin Krause
(74) *Attorney, Agent, or Firm* — Oliff PLC

(57) ABSTRACT

A rack shaft supporting device includes a support yoke, a plug, an intermediate component, a torque generation spring, and rolling elements. The plug has a plug end portion and plug cam faces formed in the plug end portion. The intermediate component is arranged between the plug and the support yoke in a state where the intermediate component is rotatable relative to the rack housing and movable relative to the rack housing in a pushing direction. The intermediate component has an intermediate opposed portion opposed to the plug end portion and intermediate cam faces opposed to the plug cam faces. The rolling elements are arranged between the plug cam faces and the intermediate cam faces, and make contact with each of the plug cam faces and the intermediate cam faces.

6 Claims, 5 Drawing Sheets

RACK SHAFT SUPPORTING DEVICE AND STEERING SYSTEM INCLUDING THE SAME

INCORPORATION BY REFERENCE/RELATED APPLICATION

This application claims priority to Japanese Patent Application No. 2012-161722 filed on Jul. 20, 2012 the disclosure of which, including the specification, drawings and abstract, is incorporated herein by reference in its entirety.

BACKGROUND OF THE INVENTION

1. Field of the Invention

The invention relates to a rack shaft supporting device that supports a rack shaft with the use of a support yoke, and a steering system including the rack shaft supporting device.

2. Discussion of Background

A steering system described in US 2010/0024583 A1 includes a support yoke, a plug, an intermediate component, and a torque generation spring. The intermediate component is located between the support yoke and the plug. The intermediate component has intermediate cam faces.

The plug has plug cam faces. The plug cam faces make surface contact with the intermediate cam faces. The torque generation spring is arranged in a space surrounded by the plug and the intermediate component. One end of the torque generation spring is attached to the plug, and the other end thereof is attached to the intermediate component. The torque generation spring applies, to the intermediate component, a force for rotating the intermediate component relative to the plug.

In the rack shaft supporting device, a force of friction between the plug cam faces and the intermediate cam faces serves as a resistance to the force that is applied by the torque generation spring to rotate the intermediate component relative to the plug. Further, in order that the intermediate component rotates relative to the plug smoothly, it is preferable that a force of friction between the plug cam faces and the intermediate cam faces be small. However, in the rack shaft supporting device, the plug cam faces make surface contact with the intermediate cam faces. Therefore, there is still room for improvement from the viewpoint of reduction in the force of friction between the plug cam faces and the intermediate cam faces.

SUMMARY OF THE INVENTION

The invention provides a rack shaft supporting device configured such that an intermediate component is allowed to rotate smoothly relative to a plug, and a steering system including the rack shaft supporting device.

According to a feature of an example of the invention, a rack shaft supporting device, including: a support yoke accommodated in a rack housing, and movable in a pushing direction in which a rack shaft is pushed toward a pinion shaft; a plug having a plug end portion formed on a support yoke side and a plug cam face formed in the plug end portion, the plug being arranged on a side opposite to the support yoke in a direction opposite to the pushing direction, and the plug being fixed to the rack housing; an intermediate component arranged between the plug and the support yoke in a state where the intermediate component is rotatable relative to the rack housing and movable relative to the rack housing in the pushing direction, the intermediate component having an intermediate opposed portion opposed to the plug end portion and an intermediate cam face formed in the intermediate opposed portion and opposed to the plug cam face; a torque generation spring that applies, to the intermediate component, a spring force for rotating the intermediate component relative to the plug; and a rolling element arranged between the plug cam face and the intermediate cam face and making contact with each of the plug cam face and the intermediate cam face.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, embodiments of the invention will be described with reference to the accompanying drawings.

Figure 1:
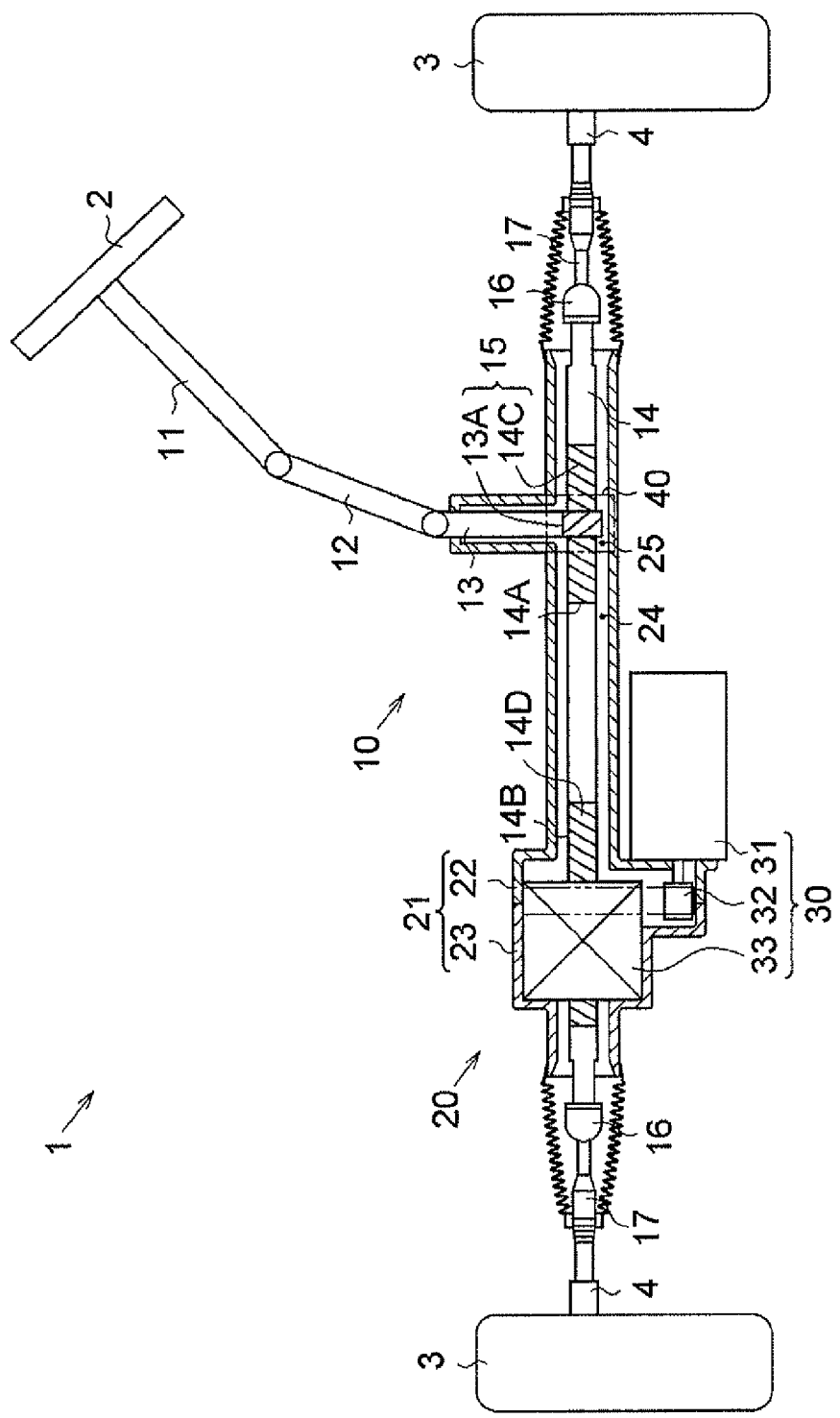
FIG. 1 is a schematic diagram illustrating the configuration of a steering system according to an embodiment of the invention.

With reference to FIG. 1, the configuration of a steering system 1 will be described. The steering system 1 includes a steering system main body 10, a shaft accommodation device 20, an assist device 30, and a rack shaft supporting device 40. The steering system 1 has a configuration as a rack parallel electric power steering system configured such that an operation of a steering wheel 2 is assisted by the assist device 30.

The steering system main body 10 includes a column shaft 11, an intermediate shaft 12, a pinion shaft 13, a rack shaft 14, a rack-and-pinion mechanism 15, ball joints 16, and tie rods 17. In the steering system main body 10, the column shaft 11, the intermediate shaft 12, and the pinion shaft 13 are rotated together with each other in accordance with the rotation of the steering wheel 2. In the steering system main body 10, the rack shaft 14 is moved linearly in its longitudinal direction due to the rotation of the pinion shaft 13. The steering system main body 10 changes the steered angle of steered wheels 3 via knuckles 4 by linearly moving the rack shaft 14.

The rack shaft 14 has a gear forming portion 14A and a thread forming portion 14B. The rack shaft 14 has a rack gear 14C that is present in the gear forming portion 14A, over a predetermined range in the longitudinal direction. The rack shaft 14 has an external thread, which serves as a rack thread 14D, in the thread forming portion 14B, over a predetermined range in the longitudinal direction. The rack shaft 14 has a substantially D-shape in a section that is perpendicular to the longitudinal direction.

The rack-and-pinion mechanism 15 has a pinion gear 13A of the pinion shaft 13 and the rack gear 14C of the rack shaft 14. The rack-and-pinion mechanism 15 converts the rotation of the pinion shaft 13 into a linear motion of the rack shaft 14.

The shaft accommodation device 20 (see FIG. 2) includes a rack housing 21, an oil seal 26, a ball bearing 27, and a needle bearing 28. The shaft accommodation device 20 is configured as an assembly of the rack housing 21, the oil seal 26, the ball bearing 27, and the needle bearing 28, which are formed as individual components.

The rack housing 21 is made of a metal material. The rack housing 21 has a tubular shape corresponding to the shape of the rack shaft 14. The rack housing 21 has a base housing 22, an end housing 23, a base accommodation space 24, and a support accommodation space 25. The rack housing 21 has a configuration in which the base housing 22 and the end housing 23, which are formed as individual components, are connected to each other. The base accommodation space 24 of the rack housing 21 accommodates the pinion shaft 13, the rack shaft 14, the ball joint 16, a speed reducer 32 of the assist device 30, and a ball screw device 33. The support accommodation space 25 of the rack housing 21 accommodates the rack shaft supporting device 40.

The assist device 30 includes an electric motor 31, the speed reducer 32, and the ball screw device 33. The assist device 30 has a configuration in which the ball screw device 33 is located at the rack thread 14D. In the assist device 30, the rotation output from the electric motor 31 is transmitted to the ball screw device 33 via the speed reducer 32 to rotate the ball screw device 33. Thus, the assist device 30 applies, to the rack shaft 14, a force that acts in the longitudinal direction of the rack shaft 14.

Figure 2:
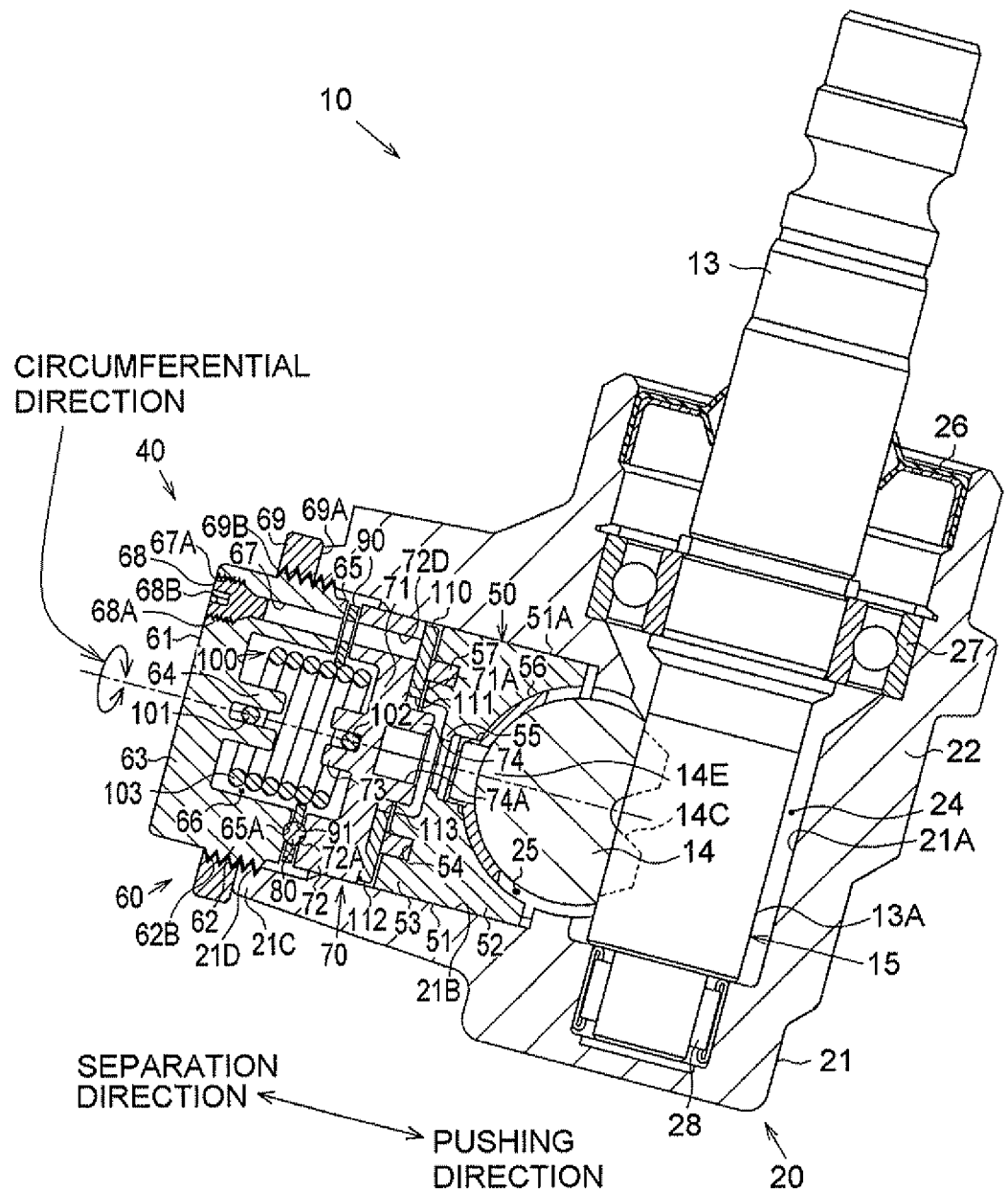
FIG. 2 is a sectional view illustrating the sectional structure of a rack shaft supporting device and its surroundings according to the embodiment.

With reference to FIG. 2, the configuration of the rack-and-pinion mechanism 15 and its surroundings will be described. The rack housing 21 has a base-portion inner face 21A that defines the base accommodation space 24. The rack housing 21 has a support-portion inner face 21B that defines the support accommodation space 25. In the rack housing 21, the support accommodation space 25 is opened outward at a support opening portion 21C. The rack housing 21 has an opening-portion female thread 21D at the support-portion inner face 21B of the support opening portion 21C. The base accommodation space 24 of the rack housing 21 accommodates the pinion gear 13A of the pinion shaft 13, the rack gear 14C of the rack shaft 14, the oil seal 26, the ball bearing 27, and the needle bearing 28.

The rack shaft supporting device 40 includes one support yoke 50, one plug 60, one intermediate component 70, three rolling elements 80, one retainer 90, one torque generation spring 100, and one intermediate ring 110. In the rack shaft supporting device 40, the support yoke 50, the plug 60, the intermediate component 70, the torque generation spring 100, and the intermediate ring 110 are coaxial with each other. The rack shaft supporting device 40 is configured such that the support yoke 50 is pushed against a rack back portion 14E of the rack shaft 14 by the plug 60, the intermediate component 70, the rolling elements 80, and the torque generation spring 100.

With reference to FIG. 2, the configuration of the rack shaft supporting device 40 will be described. Note that a pushing direction indicates the direction in which the rack shaft 14 is pushed toward the pinion shaft 13 in the support accommodation space 25. Further, a separation direction indicates the direction in which the rack shaft 14 is moved away from the pinion shaft 13 in the support accommodation space 25. Furthermore, a circumferential direction indicates the rotation direction of the torque generation spring 100.

The support yoke 50 is arranged behind the rack shaft 14 in the support accommodation space 25. In the support accommodation space 25, the support yoke 50 is movable in the pushing direction and in the separation direction. The support yoke 50 includes a yoke main body 51, a low-friction sheet 56, and a resin elastic component 57.

The yoke main body 51 is made of a metal material. The yoke main body 51 has a shape in which part of a columnar component is removed. The yoke main body 51 is supported at a main body outer face 51A by the support-portion inner face 21B of the rack housing 21. The yoke main body 51 has a yoke support portion 52 and a yoke back portion 53.

The yoke support portion 52 is formed in a portion of the yoke main body 51, which is on the rack shaft 14 side. The yoke support portion 52 has a shape corresponding to the rack back portion 14E of the rack shaft 14. The yoke support portion 52 supports the rack back portion 14E via the low-friction sheet 56.

The yoke back portion 53 has a columnar shape in which a recess portion is formed. The yoke back portion 53 is formed in a portion of the yoke main body 51, which is on the plug 60 side. The yoke back portion 53 has a yoke back groove 54 and a yoke hole portion 55. The yoke back portion 53 is opposed to the intermediate ring 110 via a clearance.

The resin elastic component 57 is fitted in the yoke back groove 54. A portion of the resin elastic component 57, which is on the plug 60 side, projects from the yoke back groove 54 so that the resin elastic component 57 makes contact with the intermediate ring 110. The resin elastic component 57 is compressed by the intermediate ring 110 and the support yoke 50. The resin elastic component 57 pushes the intermediate ring 110 against the intermediate component 70 by a restoring force caused due to compressive deformation.

The intermediate ring 110 is made of a metal material having a coefficient of friction smaller than those of the intermediate component 70 and the support yoke 50. The intermediate ring 110 is arranged between the support yoke 50 and the intermediate component 70. The intermediate ring 110 has a ring through-hole 111. A ring outer face 112 of the intermediate ring 110 is opposed, via a clearance, to the support-portion inner face 21B of the rack housing 21. A ring inner face 113 of the intermediate ring 110 is opposed, via a clearance, an outer face of a projecting portion 74 of the intermediate component 70.

The intermediate component 70 is arranged on the opposite side of the support yoke 50 from the rack shaft 14, in the support accommodation space 25. The intermediate component 70 is arranged so as to be rotatable in the circumferential direction relative to the support-portion inner face 21B of the rack housing 21 and so as to be movable in the pushing direction and the separation direction. The intermediate component 70 is rotated, by a force applied from the torque generation spring 100, relative to the support yoke 50, the plug 60, and the intermediate ring 110, thereby suppressing an increase in a clearance between the intermediate component 70 and the support yoke 50.

The plug 60 is arranged on the opposite side of the intermediate component 70 from the support yoke 50, in the support accommodation space 25. The plug 60 includes a plug main body 61, a plug stopper component 68, and a lock nut 69. The plug 60 has a configuration in which the plug main body 61, the plug stopper component 68, and the lock nut 69, which are formed as individual components, are connected to each other. In the plug 60, the plug main body 61 is coaxial with the lock nut 69. The plug 60 closes the support opening portion 21C of the rack housing 21.

The lock nut 69 is made of a metal material. The lock nut 69 has a nut end face 69A and a nut female thread 69B. The lock nut 69 is screwed at the nut female thread 69B into a plug male thread 62B of the plug main body 61. The nut end face 69A of the lock nut 69 makes contact with an end face of the support opening portion 21C. The lock nut 69 suppresses occurrence of loosening of the plug main body 61 with respect to the rack housing 21.

A torsion coil spring that serves as the torque generation spring 100 is made of a metal material. The torque generation spring 100 has a first spring end 101, a second spring end 102, and a spring turn portion 103. The first spring end 101 of the torque generation spring 100 is attached to the plug main body 61. The second spring end 102 of the torque generation spring 100 is attached to the intermediate component 70. The torque generation spring 100 applies, to the intermediate component 70, a force (hereinafter referred to as "spring force") for rotating the intermediate component 70 relative to the plug 60.

The rolling elements 80 are made of a metal material. Each rolling element 80 is formed into a spherical shape. Each rolling element 80 is arranged between a plug cam face 65A of the plug 60 and an intermediate cam face 72A of the intermediate component 70, and makes contact with the plug cam face 65A and the intermediate cam face 72A.

The retainer 90 is made of a resin material. The retainer 90 is formed into a circular ring shape in a planar view. The retainer 90 is arranged between the plug 60 and the intermediate component 70. The retainer 90 holds the rolling elements 80 such that the three rolling elements 80 are arranged at equal intervals in the circumferential direction.

Figure 3:
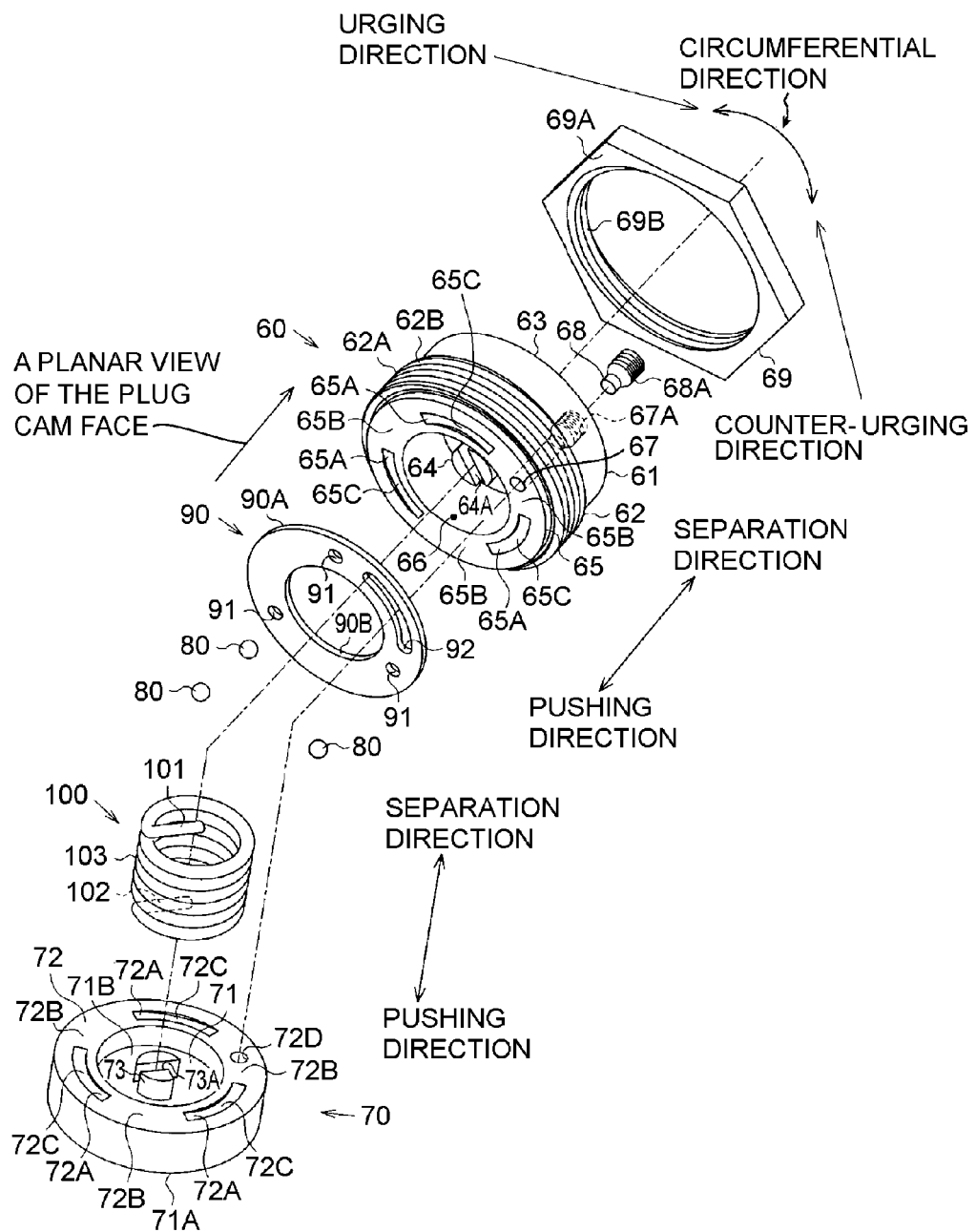
FIG. 3 is a perspective view illustrating the exploded perspective structure of rolling elements of the rack shaft supporting device and its surroundings according to the embodiment.

With reference to FIG. 3, the detailed configurations of the plug 60, the intermediate component 70, and components near the plug 60 and the intermediate component 70 will be described. Note that an urging direction indicates the direction in which a spring force is applied to the intermediate component 70 in the circumferential direction. Further, a counter-urging direction indicates the direction opposite to the urging direction in the circumferential direction.

The plug main body 61 is made of a metal material. The plug main body 61 has a shape in which one opening portion of a cylindrical component is closed. The plug main body 61 has a plug fixing portion 62, a plug back wall portion 63, a spring attached portion 64, a plug end portion 65, a plug internal space 66, and a plug temporary tightening hole 67.

The plug fixing portion 62 has a cylindrical shape. The plug fixing portion 62 has the plug male thread 62B formed in part of a fixing portion outer face 62A. The plug fixing portion 62 is screwed at the plug male thread 62B into the opening-portion female thread 21D of the rack housing 21 (see FIG. 2).

The plug back wall portion 63 has a solid structure in which no opening portion is formed. The plug back wall portion 63 is formed in a portion of the plug main body 61, which is on the opposite side of the plug fixing portion 62 from the intermediate ring 110 (see FIG. 2). The plug back wall portion 63 is arranged outside the rack housing 21 (see FIG. 2). The plug back wall portion 63 closes one of opening portions of the plug internal space 66 in the plug fixing portion 62.

The spring attached portion 64 has a columnar shape that projects into the plug internal space 66 from the plug back wall portion 63. The spring attached portion 64 is inserted into an internal space of the spring turn portion 103 of the torque generation spring 100. The spring attached portion 64 has a spring retaining groove 64A that extends in the axial direction of the plug main body 61. The spring attached portion 64 is configured such that the spring attached portion 64 is divided into two pillar portions by the spring retaining groove 64A. The first spring end 101 of the torque generation spring 100 is press-fitted into the spring retaining groove 64A of the spring attached portion 64.

The plug end portion 65 has a circular ring shape. The plug end portion 65 has the three plug cam faces 65A and three surface partition portions 65B. In the plug end portion 65, each surface partition portion 65B is formed between the plug cam faces 65A adjacent to each other in the circumferential direction. In the plug end portion 65, the plug temporary tightening hole 67 is formed in one of the surface partition portions 65B.

In a planar view of the plug cam face 65A, the plug cam face 65A has a shape in which the longitudinal direction thereof corresponds to the circumferential direction of the plug main body 61 and the lateral direction thereof corresponds to the radial direction of the plug main body 61, and which is curved along the circumferential direction. Each plug cam face 65A is recessed, in a curved shape, in the separation direction from an end face of the plug 60 in the pushing direction. More specifically, each plug cam face 65A is inclined along the circumferential direction from an end portion thereof in the urging direction toward a center position 65C in the circumferential direction, such that the distance from the end face of the plug 60 in the pushing direction to the plug cam face 65A increases in a direction toward the center position 65C. In addition, each plug cam face 65A is inclined along the circumferential direction from the center position 65C toward an end portion thereof in the counter-urging direction, such that the distance from plug cam face 65A to the end face of the plug 60 in the pushing direction decreases in a direction from the center position 65C toward the end portion. A curvature radius PR in the axial direction (see FIG. 4), of the plug cam face 65A is larger than the radius of each rolling element 80. Note that the center position 65C indicates the center point of the plug cam face 65A in the circumferential direction. At the center position 65C, the plug cam face 65A is farthest in the separation direction from the end face of the plug 60.

The plug internal space 66 has a columnar shape. The plug internal space 66 is formed as a space surrounded by an inner face of the plug fixing portion 62 and the plug back wall portion 63. The plug internal space 66 accommodates the spring attached portion 64 and the torque generation spring 100. An opening portion of the plug internal space 66, which is on the intermediate component 70 side, is closed by an intermediate component main body 71 of the intermediate component 70.

The plug temporary tightening hole 67 extends through the plug main body 61 in the axial direction of the plug main body 61. That is, the plug temporary tightening hole 67 extends through the plug back wall portion 63, the plug fixing portion 62, and the plug end portion 65. The plug temporary tightening hole 67 has a temporary tightening female thread 67A at an inner face of an opening portion on the plug back wall portion 63 side.

The plug stopper component 68 is made of a metal material. The plug stopper component 68 has a stopper-component male thread 68A and a tool insertion hole 6813 (see FIG. 2). The plug stopper component 68 is screwed at the stopper-component male thread 68A into the temporary tightening female thread 67A of the plug temporary tightening hole 67. The plug stopper component 68 closes an opening portion of the plug temporary tightening hole 67, which is on the plug back wall portion 63 side.

The intermediate component 70 is made of a metal material. The intermediate component 70 has the intermediate component main body 71, an intermediate opposed portion 72, a spring attached portion 73, and a projecting portion 74 (see FIG. 2).

The intermediate component main body 71 has a disk shape. An intermediate main body front face 71A of the intermediate component main body 71 is opposed to the intermediate ring 110. An intermediate main body back face 71B of the intermediate component main body 71 is opposed to the plug back wall portion 63 and the spring turn portion 103 of the torque generation spring 100.

The intermediate opposed portion 72 has a circular ring shape. The intermediate opposed portion 72 projects in the separation direction from a radially outer portion of the intermediate component main body 71. The intermediate opposed portion 72 has the three intermediate cam faces 72A, three surface partition portions 72B, and one intermediate temporary tightening hole 72D. In the intermediate opposed portion 72, each surface partition portion 72B is formed between the intermediate cam faces 72A adjacent to each other in the circumferential direction. The intermediate temporary tightening hole 72D is formed in one of the surface partition portions 72B in the intermediate opposed portion 72.

In a planar view of the intermediate cam face 72A, the intermediate cam face 72A has an arc shape in which the longitudinal direction thereof corresponds to the circumferential direction of the intermediate component 70 and the lateral direction thereof corresponds to the radial direction of the intermediate component 70. Each intermediate cam face 72A is recessed, in a curved shape, in the pushing direction from an end face of the intermediate component 70 in the separation direction. More specifically, each intermediate cam face 72A is inclined along the circumferential direction from an end portion thereof in the urging direction toward a center position 72C in the circumferential direction, such that the distance from the end face of the intermediate component 70 in the separation direction to the intermediate cam face 72A increases in a direction toward the center position 72C. In addition, each intermediate cam face 72A is inclined along the circumferential direction from the center position 72C toward an end portion thereof in the counter-urging direction, such that the distance from intermediate cam face 72A to the end face of the intermediate component 70 in the separation direction decreases in a direction from the center position 72C toward the end portion. A curvature radius MR (see FIG. 4), of the intermediate cam face 72A is larger than the radius of each rolling element 80. Note that the center position 72C indicates the center point of the intermediate cam face 72A in the circumferential direction. At the center position 72C, the intermediate cam face 72A is farthest in the pushing direction from the end face of the intermediate component 70.

The spring attached portion 73 projects from the intermediate main body front face 71A in the separation direction. The spring attached portion 73 is inserted into an internal space of the spring turn portion 103 of the torque generation spring 100. The spring attached portion 73 has a spring retaining groove 73A that extends in the axial direction. The spring attached portion 73 is configured such that the spring attached portion 73 is divided into two pillar portions by the spring retaining groove 73A. The second spring end 102 of the torque generation spring 100 is press-fitted into the spring retaining groove 73A of the spring attached portion 73.

The projecting portion 74 (see FIG. 2) has a cylindrical shape. The projecting portion 74 projects from the intermediate main body front face 71A of the intermediate component main body 71 in the pushing direction. The projecting portion 74 is formed so as to extend across the ring through-hole 111 of the intermediate ring 110 and the yoke hole portion 55 of the support yoke 50 (see FIG. 2). The projecting portion 74 is opposed to the support yoke 50 and the intermediate ring 110 via a clearance. The projecting portion 74 has a hexagon socket 74A (see FIG. 2) having a shape corresponding to a hexagon wrench. The projecting portion 74 is formed as a portion to which a tool for rotating the intermediate component 70 is attached, in a step of assembling the intermediate component 70 and the plug 60 together.

The retainer 90 has three retaining holes 91 and one bolt insertion hole 92. A retainer outer face 90A of the retainer 90 is opposed, via a clearance, to the support-portion inner face 21B of the rack housing 21 (see FIG. 2). A retainer inner face 90B of the retainer 90 is opposed to the torque generation spring 100 via a clearance. In the retainer 90, the retaining holes 91 are formed at equal intervals in the circumferential direction. In the retainer 90, the bolt insertion hole 92 is formed between the retaining holes 91 adjacent to each other in the circumferential direction. The bolt insertion hole 92 is formed as an elongate hole of which the longitudinal direction corresponds to the circumferential direction. The retainer 90 holds the rolling elements 80 such that the rolling elements 80 are slidable in the retaining holes 91.

With reference to FIG. 2, a method of assembling the rack shaft supporting device 40 will be described. Assembly of the rack shaft supporting device 40 is completed by sequentially performing a first assembly step to a fifth assembly step.

The first assembly step is a step of arranging the support yoke 50 on the rack back portion 14E of the rack shaft 14. In the first assembly step, a worker inserts the support yoke 50 into the support accommodation space 25 from the support opening portion 21C of the rack housing 21, and arranges the low-friction sheet 56 of the support yoke 50 on the rack back portion 14E.

The second assembly step is a step of arranging the intermediate ring 110 on the resin elastic component 57 of the support yoke 50. In the second assembly step, the worker inserts the intermediate ring 110 into the support accommodation space 25 from the support opening portion 21C of the rack housing 21 to arrange the intermediate ring 110 at such a position that the intermediate ring 110 contacts the resin elastic component 57 and a clearance is formed between the ring outer face 112 and the support-portion inner face 21B of the rack housing 21.

The third assembly step is a step of assembling a plug assembly. The plug assembly has a configuration in which the plug main body 61, the intermediate component 70, the rolling elements 80, the retainer 90, and the torque generation spring 100 are assembled together, and a temporary tightening bolt (not illustrated) is inserted into the plug temporary tightening hole 67 and the intermediate temporary tightening hole 72D. In the third assembly step, the worker assembles the plug assembly by assembling the plug main body 61, the intermediate component 70, the rolling elements 80, and the retainer 90 together, and then inserting the temporary tightening bolt into the plug temporary tightening hole 67 and the intermediate temporary tightening hole 72D.

The fourth assembly step is a step of fixing the plug assembly to the rack housing 21. In the fourth assembly step, the worker inserts the plug assembly into the support accommodation space 25 from the support opening portion 21C of the rack housing 21, and screws the plug male thread 62B of the plug main body 61 into the opening-portion female thread 21D of the rack housing 21. In the fourth assembly step, when the entirety of the plug male thread 62B is screwed into the opening-portion female thread 21D, the intermediate ring 110 is pushed against the resin elastic component 57 by the intermediate component 70 in a state where a clearance is formed between the intermediate ring 110 and the yoke back portion 53.

The fifth assembly step is a step of completing installation of the rack shaft supporting device 40 to the rack housing 21. The worker screws the nut female thread 69B of the lock nut 69 into the plug male thread 62B of the plug main body 61. Subsequently, the worker pulls out the temporary tightening bolt from the plug temporary tightening hole 67 and the intermediate temporary tightening hole 72D, and screws the stopper-component male thread 68A of the plug stopper component 68 into the temporary tightening female thread 67A of the plug temporary tightening hole 67. In the fifth assembly step, the plug 60 is assembled by screwing the plug stopper component 68 into plug main body 61, and thus, installation of the rack shaft supporting device 40 to the rack housing 21 is completed.

A method of assembling the plug assembly is described below. Assembly of the plug assembly is completed by sequentially performing a first intermediate step to a sixth intermediate step.

The first intermediate step is a step of attaching the rolling elements 80 to the retainer 90. In the first intermediate step, the worker inserts one rolling element 80 into each of the retaining holes 91 of the retainer 90. The second intermediate step is a step of attaching the torque generation spring 100 to the plug main body 61. In the second intermediate step, the worker inserts the torque generation spring 100 into the plug internal space 66 from the first spring end 101 side, and press-fits the first spring end 101 to the spring attached portion 64.

The third intermediate step is a step of attaching the rolling elements 80 and the retainer 90 to the plug 60. In the third intermediate step, the worker arranges the rolling element 80 on the plug cam face 65A. In the third intermediate step, the rolling element 80 is arranged at the center position 65C on the plug cam face 65A.

The fourth intermediate step is a step of attaching the torque generation spring 100 to the intermediate component 70. In the fourth intermediate step, the worker inserts the spring attached portion 73 of the intermediate component 70 into the plug internal space 66 and press-fits the second spring end 102 of the torque generation spring 100 to the spring attached portion 73. In the fourth intermediate step, the rolling element 80 is arranged on the intermediate cam face 72A in a process of press-fitting the second spring end 102 to the spring attached portion 73. In the fourth intermediate step, the rolling element 80 is arranged at the center position 72C of the intermediate cam face 72A.

The fifth intermediate step is a step of adjusting a spring force of the torque generation spring 100. In the fifth intermediate step, the worker attaches the plug main body 61 to a fixture (not shown), and then inserts a hexagon wrench (not shown) into the hexagon socket 74A of the projecting portion 74 of the intermediate component 70. Subsequently, the worker applies a torque to the hexagon wrench to rotate the intermediate component 70 by a predetermined amount in such a direction that a spring force of the torque generation spring 100 increases, that is, in the counter-urging direction. When the intermediate component 70 is rotated by the predetermined amount, the intermediate temporary tightening hole 72D of the intermediate component 70 is arranged on the same axis as that of the plug temporary tightening hole 67 of the plug main body 61. In the fifth intermediate step, the rolling element 80 makes contact with a portion of the plug cam face 65A, which is offset from the center position 65C in the urging direction, and a portion of the intermediate cam face 72A, which is offset from the center position 72C in the counter-urging direction.

The sixth intermediate step is a step of inserting the temporary tightening bolt into the plug main body 61 and the intermediate component 70. In the sixth intermediate step, the worker fixes the rotation position of the intermediate component 70 relative to the plug main body 61 with the use of the hexagon wrench, and inserts the temporary tightening bolt into the plug temporary tightening hole 67 and the intermediate temporary tightening hole 72D from the plug back wall portion 63 of the plug main body 61. Subsequently, the worker removes the hexagon wrench from the projecting portion 74 of the intermediate component 70, and removes the plug main body 61 from the fixture. In the sixth intermediate step, the plug assembly is thus assembled by inserting the temporary tightening bolt into the plug temporary tightening hole 67 and the intermediate temporary tightening hole 72D. In the plug assembly, the rotation position of the intermediate component 70 relative to the plug main body 61 is fixed by the temporary tightening bolt.

Figure 4:
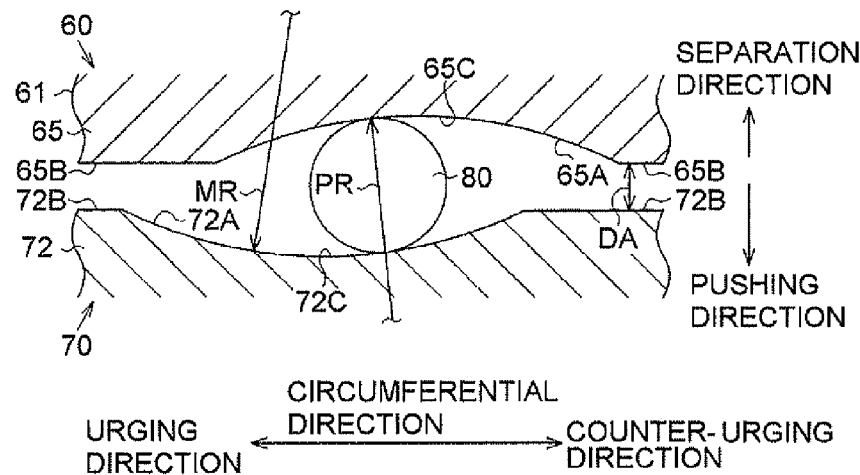
FIG. 4 is a developed view illustrating the developed structure of the rolling element, a plug, and an intermediate component of the rack shaft supporting device according to the embodiment.
Figure 5:
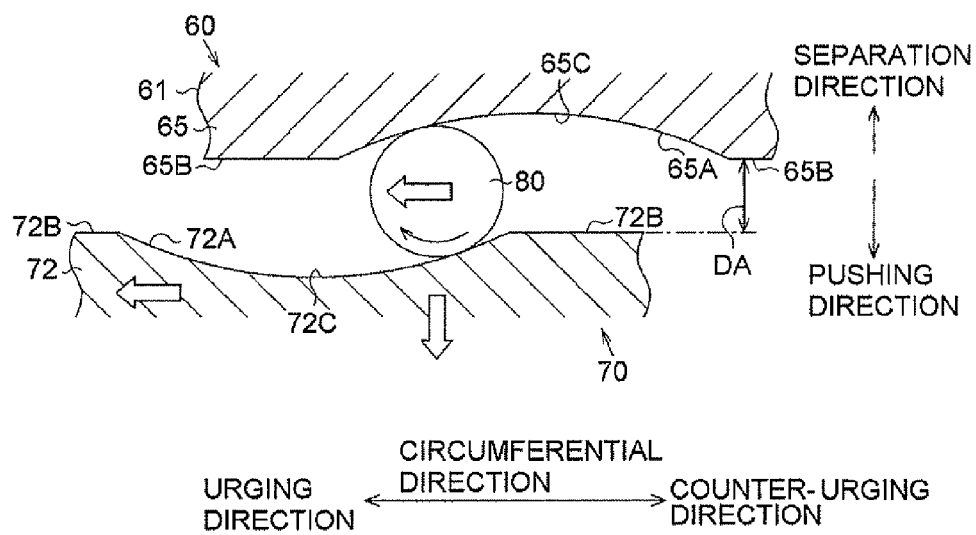
FIG. 5 is a developed view illustrating the developed structure of the rolling element, the plug, and the intermediate component of the rack shaft supporting device according to the embodiment.

With reference to FIG. 2, FIG. 4, and FIG. 5, the operation and advantageous effects of the rack shaft supporting device 40 will be described. The rack shaft supporting device 40 has a first function to a third function. The first function is a function of restraining the rack shaft 14 from moving relative to the pinion shaft 13 in the separation direction. The second function is a function of restraining a force applied from the rack gear 14C to the pinion gear 13A from increasing when a force for pushing the pinion shaft 13 in the separation direction is applied from the rack shaft 14 to the pinion shaft 13. The third function is a function of restraining a clearance at meshed portions of the rack gear 14C and the pinion gear 13A from increasing due to progress of abrasion at a friction portion of the rack shaft 14. Note that the friction portion of the rack shaft 14 includes the meshed portions of the rack gear 14C and the pinion gear 13A, and contact portions of the rack back portion 14E and the low-friction sheet 56 of the support yoke 50.

With reference to FIG. 2, the first function of the rack shaft supporting device 40 will be described. The rack shaft supporting device 40 is configured such that the plug cam faces 65A of the plug 60 make contact with the rolling elements 80 and the intermediate cam faces 72A of the intermediate component 70 make contact with the rolling elements 80, thereby restricting movement of the intermediate component 70 relative to the rack housing 21 or the like in the separation direction. The intermediate component 70 supports the yoke back portion 53 of the support yoke 50 via the intermediate ring 110 and the resin elastic component 57, thereby restricting movement of the support yoke 50 relative to the rack housing 21 or the like in the separation direction. The support yoke 50 supports, at the yoke support portion 52, the rack back portion 14E of the rack shaft 14.

Thus, movement of the rack shaft 14 relative to the pinion shaft 13 in the separation direction is restricted. This accordingly makes it possible to suppress occurrence of contact noise between components when the rack shaft 14 moves relative to the pinion shaft 13 in the separation direction or the pushing direction in response to the rotation of the pinion shaft 13. Note that, in the rack shaft supporting device 40, a clearance is formed between the yoke back portion 53 and the intermediate ring 110. Accordingly, when the yoke main body 51 receives, from the rack shaft 14, a force that acts in the separation direction, the yoke main body 51 is allowed to move in the separation direction just by an amount corresponding to the clearance between the yoke back portion 53 and the intermediate ring 110. When the yoke main body 51 moves relative to the rack housing 21 or the like in the separation direction, the compressive deformation amount of the resin elastic component 57 is increased. This increases a force with which the resin elastic component 57 pushes the yoke main body 51 in the pushing direction.

With reference to FIG. 2 and FIG. 4, the second function of the rack shaft supporting device 40 will be described. Note that a distance DA between the partition portions indicates a distance in the axial direction between the surface partition portion 65B of the plug 60 and the surface partition portion 72B of the intermediate component 70. Further, an initial state indicates a state where no abrasion has occurred in the friction portion of the rack shaft 14.

As illustrated in FIG. 4, in the initial state, the rolling element 80 makes contact with a portion of the plug cam face 65A, which is offset from the center position 65C in the urging direction, and a portion of the intermediate cam face 72A, which is offset from the center position 72C in the counter-urging direction. In view of this, the distance DA between the partition portions is larger than that in a configuration in which the rolling element 80 is arranged at the center position 65C of the plug cam face 65A and at the center position 72C of the intermediate cam face 72A.

As illustrated in FIG. 2, when a force with which the rack shaft 14 pushes the support yoke 50 in the separation direction acts on the support yoke 50, a force for pushing the intermediate component 70 in the separation direction is applied to the intermediate component 70 via the yoke back portion 53 of the yoke main body 51, the resin elastic component 57, and the intermediate ring 110. At this time, the rolling elements 80 are pushed against the plug cam faces 65A by the intermediate component 70. Accordingly, reaction force from the plug cam faces 65A acts on the rolling elements 80. Reaction force from the rolling elements 80 acts on the intermediate cam faces 72A. Thus, a force for rotating the intermediate component 70 in the counter-urging direction acts on the intermediate component 70. This causes the intermediate component 70 to rotate in the counter-urging direction. At this time, as illustrated in FIG. 4, the rolling element 80 moves toward the center position 65C of the plug cam face 65A and toward the center position 72C of the intermediate cam face 72A, thereby reducing the distance DA between the partition portions. That is, the intermediate component 70 moves in the separation direction. Consequently, the support yoke 50 (see FIG. 2) moves in the separation direction, thereby making it possible to suppress an increase in a force that acts on the meshed portions of the rack gear 14C and the pinion gear 13A (see FIG. 2).

With reference to FIG. 4 and FIG. 5, the third function of the rack shaft supporting device 40 will be described. The torque generation spring 100 (see FIG. 3) applies, to the intermediate component 70, a force for rotating the intermediate component 70 relative to the plug 60. That is, the torque generation spring 100 applies, to the intermediate component 70, a force for rotating the intermediate cam face 72A relative to the plug cam face 65A.

A spring force applied to the intermediate component 70 acts in the same direction as the pushing direction by the rolling elements 80 that have brought into contact with the intermediate cam face 72A. Therefore, the intermediate component 70 is in a state where the intermediate component 70 attempts to move in the pushing direction relative to the plug main body 61 due to the spring force applied to the intermediate component 70.

On the other hand, movement of the intermediate component 70 relative to the rack housing 21 or the like in the pushing direction is restricted by the support yoke 50 (see FIG. 2). Therefore, in a state where the spring force is applied to the intermediate component 70 from the torque generation spring 100, the intermediate component 70 does not move relative to the plug main body 61 in the pushing direction. However, when an abrasion loss of the friction portion of the rack shaft 14 (see FIG. 2) increases, a range in which the support yoke 50 is allowed to move relative to the rack housing 21 or the like in the pushing direction increases. Therefore, a range in which the intermediate component 70 is allowed to move relative to the rack housing 21 or the like in the pushing direction also increases.

Accordingly, the intermediate component 70 rotates relative to the plug main body 61 due to the spring force of the torque generation spring 100. At this time, as illustrated in FIG. 5, the rolling element 80 moves toward the end portion of the plug cam face 65A in the urging direction. Further, the rolling element 80 moves toward the end portion of the intermediate cam face 72A in the counter-urging direction. Thus, the distance DA between the partition portions increases in comparison with the distance DA between the partition portions in the initial state. That is, the intermediate component 70 moves in the pushing direction from the position in the initial state. This allows the relative positional relationship between the intermediate component 70 and the support yoke 50 in the pushing direction to be maintained substantially the same as the relationship before the intermediate component 70 rotates relative to the plug main body 61. That is, the relative positional relationship between the intermediate component 70 and the support yoke 50 in the pushing direction is maintained substantially the same as the relationship before the abrasion loss of the friction portion of the rack shaft 14 increases.

This makes it possible to suppress an increase in a range in which the support yoke 50 is allowed to move relative to the rack back portion 14E (see FIG. 2) in the separation direction due to an increase in the abrasion loss of the friction portion of the rack shaft 14. Accordingly, the occurrence of contact noise between the pinion shaft 13 (see FIG. 2) and the rack shaft 14 is suppressed even when the abrasion loss of the friction portion of rack shaft 14 increases.

The steering system 1 according to the present embodiment produces the following advantageous effects.

(1) The rack shaft supporting device 40 includes the rolling elements 80 that make contact with the plug cam faces 65A and the intermediate cam faces 72A. With this configuration, because the rolling elements 80 roll relative to the intermediate cam faces 72A and the plug cam faces 65A while making contact with the surfaces 72A, 65A, a rotational resistance of the intermediate component 70 is small in comparison with a configuration in which intermediate cam faces make contact with plug cam faces directly. As a result, the intermediate component 70 is allowed to rotate relative to the plug 60 smoothly.

(2) The rack shaft supporting device 40 is configured such that the rolling element 80 makes contact with a portion of the plug cam face 65A, which is offset from the center position 65C in the urging direction, and a portion of the intermediate cam face 72A, which is offset from the center position 72C in the counter-urging direction. With this configuration, when the rack shaft 14 pushes the support yoke 50 in the separation direction, the intermediate component 70 rotates relative to the plug 60 in the counter-urging direction, thereby causing the support yoke 50 and the intermediate component 70 to move in the separation direction. This suppresses an increase in a force that acts on the meshed portions of the rack gear 14C and the pinion gear 13A.

(3) The rack shaft supporting device 40 includes the retainer 9. With this configuration, because the retainer 90 holds the rolling elements 80, it is possible to restrain the rolling elements 80 from making contact with each other and the rolling elements 80 from moving individually. Consequently, it is possible to restrain occurrence of a problem that the rolling elements 80 move individually so that the intermediate component 70 is inclined with respect to the plug 60.

The invention includes embodiments other than the foregoing embodiment. Modified examples of the foregoing embodiment will be described as other embodiments of the invention. Note that the following modified examples may be employed in combination.

The support yoke 50 according to the foregoing embodiment is configured such that the yoke main body 51, the yoke support portion 52, and the yoke back portion 53 are formed as a single-piece member from the same metal material. On the other hand, a support yoke 50 according to a modified example may be configured that at least one of a yoke support portion 52 and a yoke back portion 53 is formed as an individual component independent of a yoke main body 51. The support yoke 50 according to this modified example is configured such that at least one of the yoke support portion 52 and the yoke back portion 53, which is formed as an individual component, is connected to the yoke main body 51. In the support yoke 50 according to this modified example, at least one of the yoke support portion 52 and the yoke back portion 53 may be made of a material different from that for the yoke main body 51.

The plug main body 61 of the plug 60 according to the foregoing embodiment is configured such that the plug fixing portion 62, the plug back wall portion 63, and the plug end portion 65 are formed as a single-piece member from the same metal material. On the other hand, a plug 60 according to a modified example may be configured such that at least one of a plug back wall portion 63 and a plug end portion 65 is formed as an individual component independent of a plug fixing portion 62. A plug main body 61 of the plug 60 according to this modified example is configured such that at least one of the plug back wall portion 63 and the plug end portion 65, which is formed as an individual component, is connected to the plug fixing portion 62. In the plug main body 61 according to this modified example, at least one of the plug back wall portion 63 and the plug end portion 65 may be made of a material different from that for the plug fixing portion 62.

The plug main body 61 of the plug 60 according to the foregoing embodiment is configured such that the plug back wall portion 63 and the spring attached portion 64 are formed as a single-piece member from the same metal material. On the other hand, a plug main body 61 according to a modified example may be configured such that a spring attached portion 64 is formed as an individual component independent of a plug back wall portion 63. The plug main body 61 according to this modified example is configured such that the spring attached portion 64 is connected to the plug back wall portion 63. In the plug main body 61 according to this modified example, the spring attached portion 64 may be made of a material different from that for the plug back wall portion 63.

Figure 6:
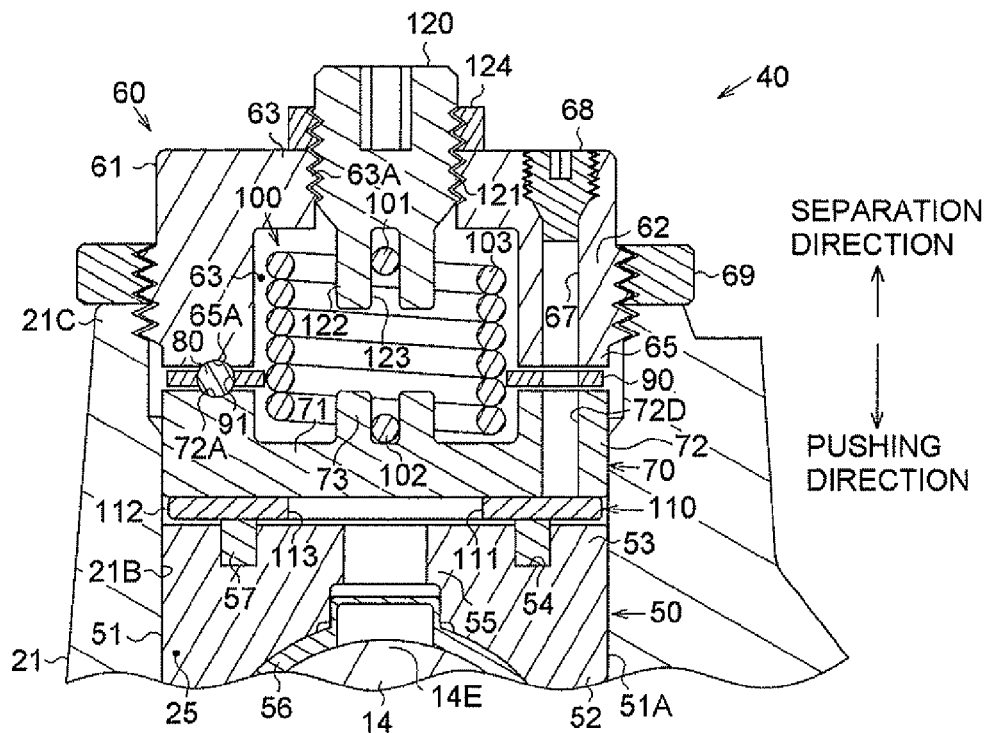
FIG. 6 is a sectional view illustrating a rack shaft supporting device according to another embodiment of the invention.

Further, a plug main body 61 according to another modified example may have a spring adjustment component 120 and a lock nut 124, instead of the spring attached portion 64, as illustrated in FIG. 6. The spring adjustment component 120 is formed as an individual component independent of a plug back wall portion 63. The spring adjustment component 120 is made of a metal material. The spring adjustment component 120 is formed into a columnar shape. The spring adjustment component 120 has an male thread 121, a spring attached portion 122, and a spring retaining groove 123. The spring adjustment component 120 is connected to the plug back wall portion 63 by screwing the male thread 121 into a threaded hole 63A formed in the plug back wall portion 63. The spring adjustment component 120 is configured such that the spring attached portion 122 projects from the plug back wall portion 63 into a plug internal space 66. The spring adjustment component 120 is configured such that the spring attached portion 122 is divided into two pillar portions by the spring retaining groove 123. In the spring adjustment component 120, a first spring end 101 of a torque generation spring 100 is press-fitted into the spring retaining groove 123. The spring adjustment component 120 is configured such that the lock nut 124 is screwed into the male thread 121. The lock nut 124 makes contact with an end face of the plug back wall portion 63 in the separation direction. The lock nut 124 restrains occurrence of loosening of the spring adjustment component 120 with respect to the plug main body 61.

In a rack shaft supporting device 40 including the plug main body 61 according to this modified example, a projecting portion 74 may be omitted from an intermediate component 70. In the rack shaft supporting device 40, adjustment of a spring force of a torque generation spring 100 is performed as follows. That is, a worker fixes a plug 60 and an intermediate component 70 with the use of a temporary tightening bolt. The worker then rotates the spring adjustment component 120 by a predetermined amount in such a direction that the spring force of the torque generation spring 100 increases in the circumferential direction. Subsequently, the worker attaches the lock nut 124 to the spring adjustment component 120.

The intermediate component 70 according to the foregoing embodiment is configured such that the intermediate component main body 71, the intermediate opposed portion 72, the spring attached portion 73, and the projecting portion 74 are formed as a single-piece member from the same metal material. On the other hand, an intermediate component 70 according to a modified example may be configured such that at least one of an intermediate opposed portion 72, a spring attached portion 73, and a projecting portion 74 is formed as an individual component independent of an intermediate component main body 71. The intermediate component 70 according to this modified example is configured such that at least one of the intermediate opposed portion 72, the spring attached portion 73, and the projecting portion 74 is connected to the intermediate component main body 71. In the intermediate component 70 according to this modified example, at least one of the intermediate opposed portion 72, the spring attached portion 73, and the projecting portion 74 may be made of a material different from that for the intermediate component main body 71.

The rack shaft supporting device 40 according to the foregoing embodiment includes the plug cam faces 65A each of which is recessed, in a curved shape, from the side in the pushing direction toward the side in the separation direction, and the intermediate cam faces 72A each of which is recessed, in a curved shape, from the side in the separation direction toward the side in the pushing direction. On the other hand, a rack shaft supporting device 40 according to a modified example may have any one of the following configurations.

(A1) The rack shaft supporting device 40 according to the modified example is configured such that plug cam faces 65A or intermediate cam faces 72A are formed into a planar shape parallel to the radial direction.

(A2) In the rack shaft supporting device 40 according to the modified example, each plug cam face 65A is formed into such a planar shape that the plug cam face 65A is inclined from the side in the pushing direction toward the side in the separation direction, along a direction from the side in the urging direction toward the side in the counter-urging direction.

(A3) In the rack shaft supporting device 40 according to the modified example, each intermediate cam face 72A is formed into such a planar shape that the intermediate cam face 72A is inclined from the side in the pushing direction toward the side in the separation direction, along a direction from the side in the urging direction toward the side in the counter-urging direction.

(A4) The rack shaft supporting device 40 according to the modified example includes plug cam faces 65A each of which is formed into such a planar shape that the plug cam face 65A is inclined from the side in the pushing direction toward the side in the separation direction, along a direction from the side in the urging direction toward the side in the counter-urging direction, and intermediate cam faces 72A each of which is formed into such a planar shape that the intermediate cam face 72A is inclined from the side in the pushing direction toward the side in the separation direction, along a direction from the side in the urging direction toward the side in the counter-urging direction.

(A5) The rack shaft supporting device 40 according to the modified example includes plug cam faces 65A each of which is formed into such a planar shape that the plug cam face 65A is inclined from the side in the separation direction toward the side in the pushing direction, along a direction from the side in the urging direction toward the side in the counter-urging direction, and intermediate cam faces 72A each of which is formed into such a planar shape that the intermediate cam face 72A is inclined from the side in the pushing direction toward the side in the separation direction, along a direction from the side in the urging direction toward the side in the counter-urging direction.

(A6) The rack shaft supporting device 40 according to the modified example includes plug cam faces 65A each of which is formed into a planar shape parallel to the radial direction, and intermediate cam faces 72A each of which is formed into such a planar shape that the intermediate cam face 72A is inclined from the side in the pushing direction toward the side in the separation direction, along a direction from the side in the urging direction toward the side in the counter-urging direction.

(A7) The rack shaft supporting device 40 according to the modified example includes plug cam faces 65A each of which is formed into such a planar shape that the plug cam face 65A is inclined from the side in the pushing direction toward the side in the separation direction, along a direction from the side in the urging direction toward the side in the counter-urging direction, and intermediate cam faces 72A each of which formed into a planar shape parallel to the radial direction.

The rack shaft supporting device 40 according to the foregoing embodiment is configured such that each plug cam face 65A is inclined along the circumferential direction from the end portion thereof in the urging direction toward the center position 65C, such that the distance from the end face of the plug 60 in the pushing direction to the plug cam face 65A increases in a direction toward the center position 65C. On the other hand, a rack shaft supporting device 40 according to a modified example may have any one of the following configurations.

(B1) In the rack shaft supporting device 40 according to the modified example, a portion of a plug cam face 65A, which extends from its end portion in the urging direction to a center position 65C, is formed into a planar shape parallel to the radial direction of a plug main body 61.

(B2) In the rack shaft supporting device 40 according to the modified example, a plug cam face 65A is formed into a planar shape inclined from the side in the pushing direction toward the side in the separation direction, in a direction from its end portion in the urging direction to a center position 65C.

The rack shaft supporting device 40 according to the foregoing embodiment is configured such that the plug cam face 65A is inclined in a curved shape from the side in the separation direction toward the side in the pushing direction, in a direction from the center position 65C to its end portion in the counter-urging direction. On the other hand, a rack shaft supporting device 40 according to a modified example may have any one of the following configurations.

(C1) In the rack shaft supporting device 40 according to the modified example, a portion of a plug cam face 65A, which extends from a center position 65C to its end portion in the counter-urging direction, is formed into a planar shape parallel to the radial direction of a plug main body 61.

(C2) In the rack shaft supporting device 40 according to the modified example, a plug cam face 65A is formed into a planar shape inclined from the side in separation direction toward the side in the pushing direction, in a direction from a center position 65C to its end portion in the counter-urging direction.

(C3) In the rack shaft supporting device 40 according to the modified example, a plug cam face 65A is formed into a planar shape inclined from the side in the pushing direction toward the side in the separation direction, in a direction from a center position 65C to its end portion in the counter-urging direction.

The rack shaft supporting device 40 according to the foregoing embodiment is configured such that the intermediate cam face 72A is inclined in a curved shape from the side in the pushing direction toward the side in the separation direction, in a direction from the center position 65C to its end portion in the counter-urging direction. On the other hand, a rack shaft supporting device 40 according to a modified example may have any one of the following configurations.

(D1) In the rack shaft supporting device 40 according to the modified example, a portion of an intermediate cam face 72A, which extends from a center position 72C to its end portion in the counter-urging direction, is formed into a planar shape parallel to the radial direction of an intermediate component 70.

(D2) In the rack shaft supporting device 40 according to the modified example, an intermediate cam face 72A is formed into a planar shape inclined from the side in the pushing direction toward the side in the separation direction, in a direction from a center position 72C to its end portion in the counter-urging direction.

The rack shaft supporting device 40 according to the foregoing embodiment is configured such that the intermediate cam face 72A is inclined in a curved shape from side in the separation direction toward the side in the pushing direction, in a direction from its end portion in the urging direction to the center position 72C. On the other hand, a rack shaft supporting device 40 according to a modified example may have any one of the following configurations.

(E1) In the rack shaft supporting device 40 according to the modified example, a portion of an intermediate cam face 72A, which extends from its end portion in the urging direction to a center position 72C, is formed into a planar shape parallel to the radial direction of an intermediate component 70.

(E2) In the rack shaft supporting device 40 according to the modified example, an intermediate cam face 72A is formed in a planar shape inclined from the side in the separation direction toward the side in the pushing direction, in a direction from its end portion in the urging direction to a center position 72C.

(E3) In the rack shaft supporting device 40 according to the modified example, an intermediate cam face 72A is formed in a planar shape inclined from the side in the pushing direction toward the side in the separation direction, in a direction from its end portion in the urging direction to a center position 72C.

Each rolling element 80 according to the foregoing embodiment is formed into a spherical shape. On the other hand, a rolling element 80 according to a modified example is formed into a cylindrical shape. As the rolling element 80 in this modified example, a roller may be used.

The rolling elements 80 according to the foregoing embodiment are arranged such that one rolling element 80 is arranged between one plug cam face 65A and one intermediate cam face 72A. On the other hand, rolling elements 80 according to a modified example may be arranged such that a plurality of the rolling elements 80 is arranged between one plug cam face 65A and one intermediate cam face 72A.

The rack shaft supporting device 40 according to the foregoing embodiment includes three rolling elements 80. On the other hand, a rack shaft supporting device 40 according to a modified example may include four or more rolling elements 80. In the rack shaft supporting device 40 according to this modified example, a plug 60 has plug cam faces 65A the number of which is the same as the number of the rolling elements 80, and an intermediate component 70 has intermediate cam faces 72A the number of which is the same as the number of the rolling elements 80. Further, in a rack shaft supporting device 40 according to another modified example, a plurality of the rolling elements 80 is arranged between one plug cam face 65A and one intermediate cam face 72A.

The rack shaft supporting device 40 according to the foregoing embodiment includes the retainer 90. On the other hand, a rack shaft supporting device 40 according to a modified example need not include a retainer 90.

Figure 7:
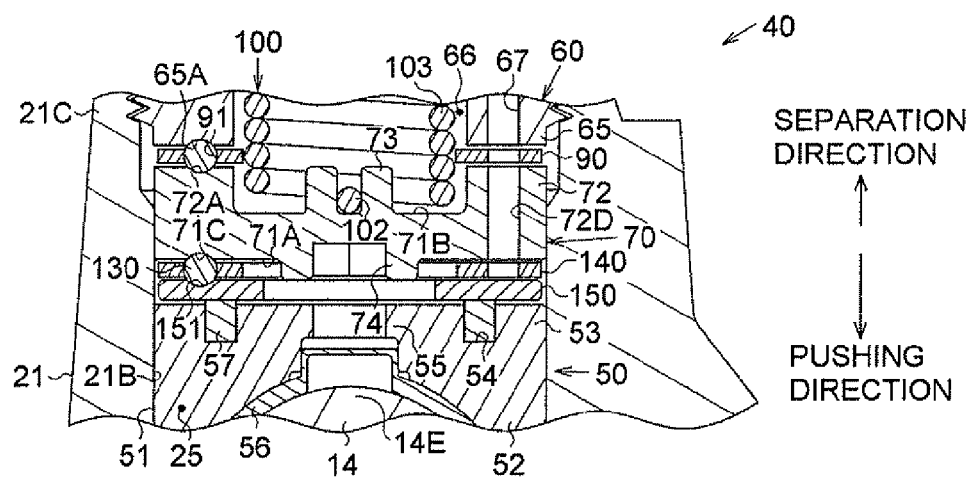
FIG. 7 is a sectional view illustrating a rack shaft supporting device according to another embodiment of the invention.

The rack shaft supporting device 40 according to the foregoing embodiment is configured such that the intermediate ring 110 makes surface contact with the intermediate main body front face 71A of the intermediate component 70. On the other hand, a rack shaft supporting device 40 according to a modified example may be configured such that three rolling elements 130 and one retainer 140 are arranged between an intermediate component 70 and an intermediate ring 150, as illustrated in FIG. 7. More specifically, an intermediate main body front face 71A of the intermediate component 70 has intermediate rolling surfaces 71C each having the same shape as the plug cam face 65A of the plug 60. The intermediate rolling surfaces 71C are formed in portions of the intermediate component 70, which are at the same positions as the plug cam faces 65A in the circumferential direction and the radial direction of the intermediate component 70. The intermediate ring 150 has a shape similar to that of the intermediate ring 110 in the foregoing embodiment. The intermediate ring 150 has intermediate-ring rolling surfaces 151 each having the same shape as the intermediate cam face 72A of the intermediate component 70. The intermediate-ring rolling surfaces 151 are formed in portions of the intermediate ring 150, which are at the same positions as the intermediate cam faces 72A in the circumferential direction and the radial direction of the intermediate ring 150. The rolling elements 130 makes contact with the intermediate rolling surfaces 71C and the intermediate-ring rolling surfaces 151, at positions between the intermediate rolling surfaces 71C and the intermediate-ring rolling surfaces 151. The retainer 140 has the same shape as the retainer 90.

With this configuration, because the intermediate component 70 rotates relative to the intermediate ring 150 via the rolling elements 130, a rotational resistance of the intermediate component 70 is reduced in comparison with a configuration in which the intermediate component 70 makes surface contact with the intermediate ring 150. Consequently, the intermediate component 70 is allowed to rotate relative to the intermediate ring 150 smoothly.

In the rack shaft supporting device 40 according to the above modified example, the intermediate ring 150 and the resin elastic component 57 may be omitted. That is, in the rack shaft supporting device 40 according to the above modified example, the rolling elements 130 may be interposed between the intermediate component 70 and the support yoke 50 while making contact with the intermediate component 70 and the support yoke 50.

The rack shaft supporting device 40 according to the foregoing embodiment includes a torsion coil spring as the torque generation spring 100. On the other hand, a rack shaft supporting device 40 according to a modified example may have a spiral spring as a torque generation spring 100.

The rack shaft supporting device 40 according to the foregoing embodiment is configured such that the resin elastic component 57 is attached to the yoke main body 51. On the other hand, a rack shaft supporting device 40 according to a modified example may be configured such that a yoke main body 51 is not provided with a resin elastic component 57.

The rack shaft supporting device 40 according to the foregoing embodiment includes the intermediate ring 110. On the other hand, a rack shaft supporting device 40 according to a modified example need not include an intermediate ring 110.

The steering system 1 according to the foregoing embodiment includes the rack shaft 14 having a substantially D-shape in a section that is perpendicular to the axial direction. On the other hand, a steering system 1 according to a modified example may include a rack shaft having a substantially Y-shape in a section perpendicular to the axial direction.

The steering system 1 according to the foregoing embodiment has a configuration as a rack parallel electric power steering system. On the other hand, a steering system 1 according to a modified example may have a configuration as an electric power steering system of a column-assist type, a pinion-assist type, a dual-pinion-assist type, or a rack-coaxial type.

The steering system 1 according to the foregoing embodiment has a configuration as an electric power steering system including the assist device 30. On the other hand, a steering system 1 according to a modified example has a configuration as a mechanical steering system in which an assist device 30 is not provided.

What is claimed is:

1. A rack shaft supporting device, comprising:
a support yoke accommodated in a rack housing, and movable in a pushing direction in which a rack shaft is pushed toward a pinion shaft;
a plug having a plug end portion formed on a support yoke side and a plug cam face formed in the plug end portion, the plug being arranged on a side opposite to the support yoke in a direction opposite to the pushing direction, and the plug being fixed to the rack housing;
an intermediate component arranged between the plug and the support yoke in a state where the intermediate component is rotatable relative to the rack housing and movable relative to the rack housing in the pushing direction, the intermediate component having an intermediate opposed portion opposed to the plug end portion and an intermediate cam face formed in the intermediate opposed portion and opposed to the plug cam face;

a torque generation spring that applies, to the intermediate component, a spring force for rotating the intermediate component relative to the plug; and a rolling element arranged between the plug cam face and the intermediate cam face and making contact with each of the plug cam face and the intermediate cam face.

2. The rack shaft supporting device according to claim 1, wherein:

in a planar view of the plug cam face, the plug cam face has an arc shape along a circumferential direction, which is a rotation direction of the torque generation spring, the plug cam face being inclined toward a side in the pushing direction from a center position of the plug cam face in the circumferential direction toward a side in an urging direction, in which the torque generation spring applies the spring force to the intermediate component; and in a planar view of the intermediate cam face, the intermediate cam face has an arc shape along the circumferential direction, the intermediate cam face being inclined toward a side in a separation direction from a center position of the intermediate cam face in the circumferential direction toward a side in a counter-urging direction.

3. The rack shaft supporting device according to claim 2, wherein:

the plug cam face has a shape inclined toward the side in the pushing direction, in a direction from the center position of the plug cam face in the circumferential direction toward the side in the counter-urging direction; and the intermediate cam face has a shape inclined toward the side in the separation direction, in a direction from the center position of the intermediate cam face in the circumferential direction toward the side in the urging direction.

4. The rack shaft supporting device according to claim 2, wherein:

the center position of the intermediate cam face in the circumferential direction is offset in the urging direction from the center position of the plug cam face in the circumferential direction; and the rolling element makes contact with a portion of the plug cam face, which is offset in the urging direction from the center position of the plug cam face in the circumferential direction, and makes contact with a portion of the intermediate cam face, which is offset in the counter-urging direction from the center position of the intermediate cam face in the circumferential direction.

5. The rack shaft supporting device according to claim 1, comprising:

a plurality of the rolling elements; and a retainer, wherein:

the retainer holds the rolling elements in a state where the rolling elements are apart from each other in the circumferential direction.

6. A steering system comprising:

a rack housing;

a rack shaft;

a pinion shaft meshed with the rack shaft; and the rack shaft supporting device according to claim 1.

* * * * *